Nov. 20, 1934.  E. H. FAHRNEY  1,981,098
LAWN MOWER ATTACHMENT
Filed May 21, 1932  2 Sheets-Sheet 1

INVENTOR.
EMERY H. FAHRNEY
BY
ATTORNEY

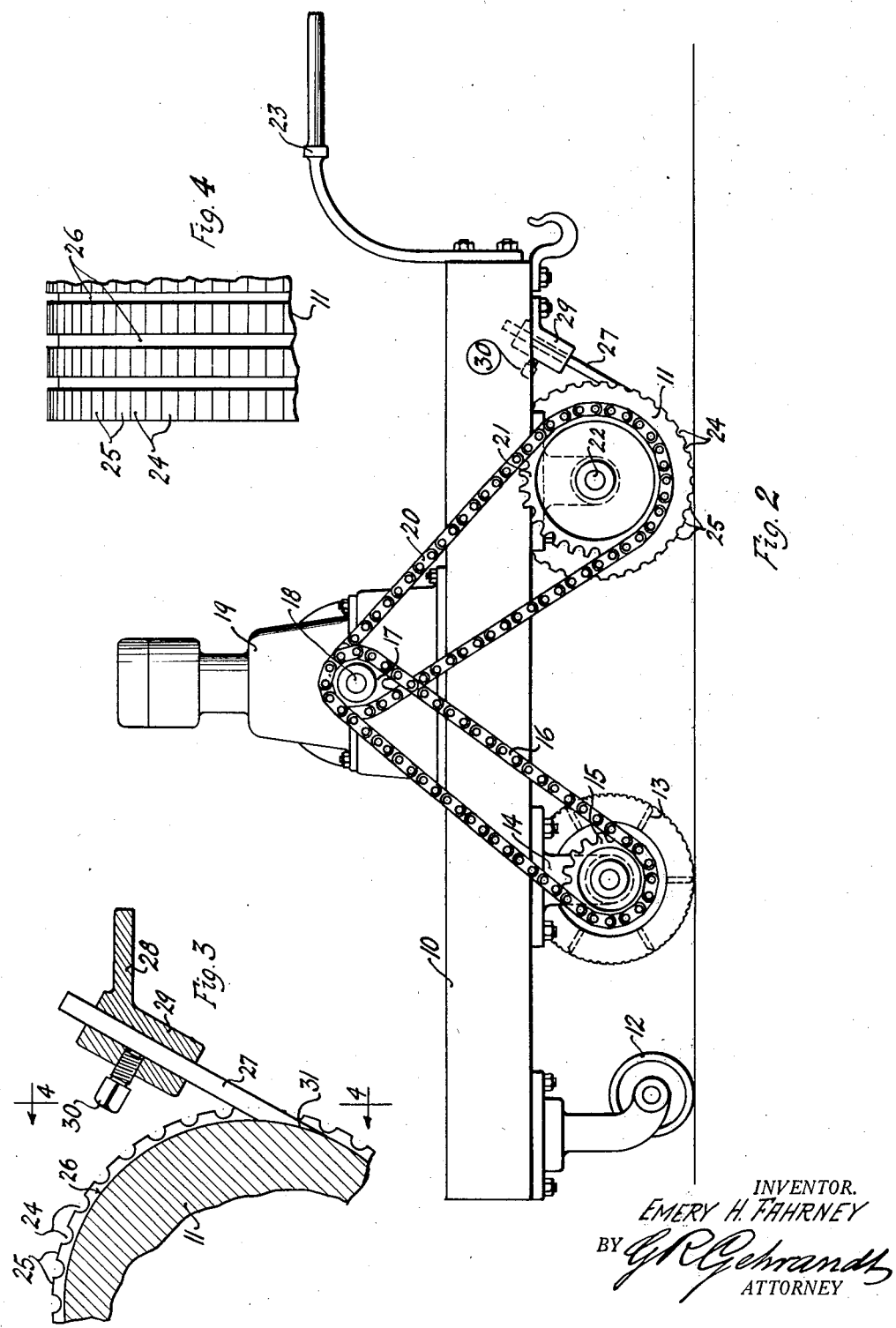

Patented Nov. 20, 1934

1,981,098

UNITED STATES PATENT OFFICE 1,981,098

LAWN MOWER ATTACHMENT

Emery H. Fahrney, Chicago, Ill.

Application May 21, 1932, Serial No. 612,717

1 Claim. (Cl. 280—158)

This invention relates to improvements in attachments, particularly adapted though not necessarily limited in its use, in connection with lawn mowers.

It has been found that the traction wheels of lawn mowers, which are provided with corrugations or grooves extending in directions lengthwise of the axes of the wheels to insure a firm hold upon the ground, frequently become clogged or filled with dirt and foreign matter that becomes so firmly compacted therein that it will not be dislodged or thrown out by the rotation of the wheels. This results in a slipping of the wheels which interferes with and impairs the progress of the machine.

It is one of the objects of the present invention to provide improved means for loosening or dislodging the compacted mass or clods from the grooves or corrugations of the traction wheels.

To the attainment of these ends and the accomplishment of other new and useful objects as will appear, the invention consists in the features of novelty in substantially the construction, combination and arragement of the several parts hereinafter more fully described and claimed and shown in the accompanying drawings illustrating this invention and 'in which Figure 1 is a top plan view of a typical form of lawn mower, having an attachment constructed in accordance with the principles of this invention applied thereto.

Figure 2 is a side elevation of Figure 1.

Figure 3 is a detail sectional view taken on line 3—3, Figure 1, on an enlarged scale.

Figure 4 is a view taken on line 4—4, Figure 3, with parts omitted.

Figure 1:
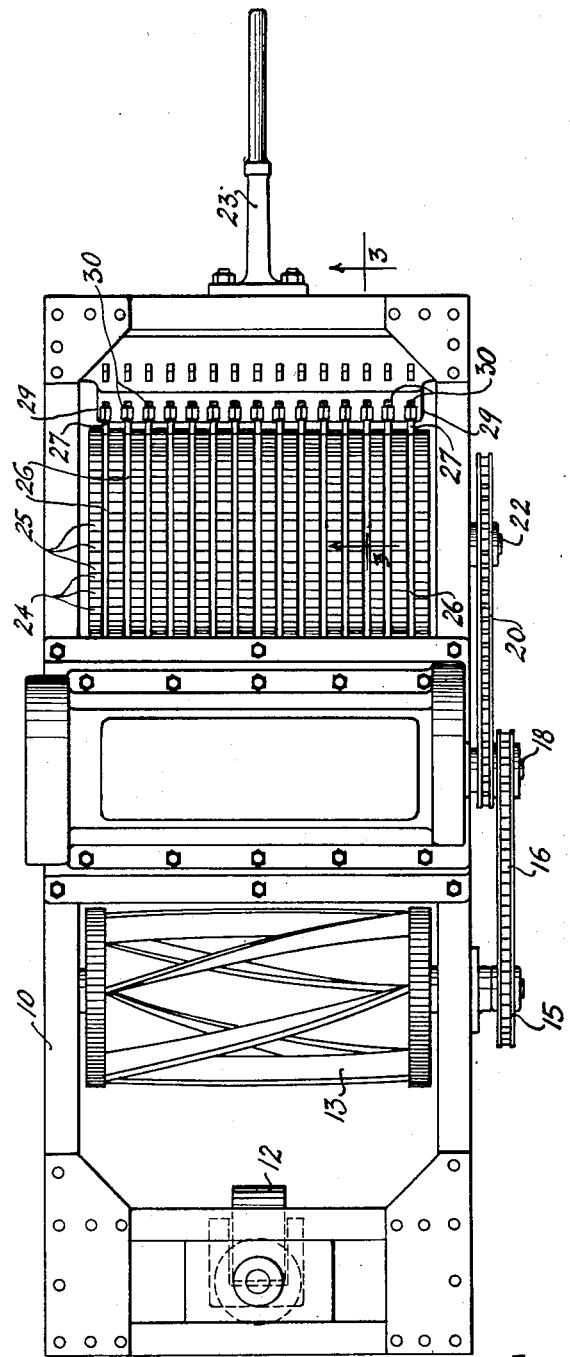

Referring more particularly to the drawings, the numeral 10 designates generally the frame of the lawn mower which is supported by a traction wheel 11, preferably of a length to extend across the frame 10, and also by a castor wheel 12 located at the front of the frame.

A rotary cutter 13 of the usual construction, is rotatably mounted in bearings 14 and connected with the axle of the cutter is a sprocket wheel 15, over which a sprocket chain 16 passes. This chain 16 also passes over a sprocket wheel 17 secured to the shaft 18 of the motor 19 mounted upon the frame 10.

The traction wheel 11 is driven by means of a sprocket chain 20 which passes over a sprocket wheel also secured to the shaft 18 of the motor and the sprocket chain 20 also passes over a sprocket wheel 21 secured to the axle 22 of the traction wheel 11.

The device may be steered by means of a handle 23 conveniently arranged.

All of the above referred to parts of the ordinary and well known construction.

The periphery of the traction wheel 11 is corrugated in any suitable manner so as to form grooves 24 extending in directions lengthwise of the axle 22 and which grooves produce lugs or projections 25 for contacting the ground.

Arranged at suitable intervals on the traction wheel are circumferential grooves or depressions 26 which are laterally spaced from each other in directions lengthwise of the axis of the traction wheel, and these grooves 26, any number of which may be provided, are of a depth considerably greater than the depth of the grooves 24 and intersect the grooves 24.

Scrapers 27 are provided so as to extend into each of the grooves 26, preferably to rest upon the bottom of the grooves and these scrapers may be held in position in any suitable manner such as by means of a holder 28 provided with sockets 29 into which the respective scrapers 27 project. Fastening screws 30 are provided for holding the scrapers in position.

With this improved construction it will be manifest that as the scrapers 27 project into the grooves 26 and in close proximity to the bottom thereof, the forward extremities of the scrapers being preferably reduced or sharpened as at 31, they will engage or pass under the compacted masses or clods not only in the grooves 26, but also under projecting portions of the clods or masses which are in the grooves 24, during the rotation of the traction wheels, thereby not only loosening the clods or compacted masses, but entirely removing the same, causing the grooves to be maintained free from such masses, thereby insuring a proper traction engagement of the wheels 11 upon the surface of the ground.

While the preferred form of the invention has been herein shown and described, it is to be understood that various changes may be made in the details of construction and in the combination and arrangement of the several parts, within the scope of the claims, without departing from the spirit of this invention.

What is claimed as new is:—

A device of the character described comprising as an integral structure a traction wheel, the periphery of the wheel being provided with grooves extending longitudinally of the axis of the wheel entirely across and spaced circumferentially around the periphery of the wheel to provide ground engaging lugs, and an additional groove in the periphery of and extending circumferentially about and spaced from the lateral faces of the wheel, said additional groove intersecting the first said grooves, the bottom of the circumferential groove being disposed below the bottoms of said longitudinal grooves and adapted to receive a scraper against the bottom thereof to pass beneath portions of clods or masses seated in the first recited grooves, to remove said clods as the wheel rotates.

EMERY H. FAHRNEY.